United States Patent

Fujisaki et al.

[11] Patent Number: 5,022,068
[45] Date of Patent: Jun. 4, 1991

[54] BRANCHED TELEPHONE SYSTEM

[75] Inventors: Hisashi Fujisaki; Keiko Shimada, both of Tokyo, Japan

[73] Assignee: NEC Corporation, Japan

[21] Appl. No.: 162,878

[22] Filed: Mar. 2, 1988

[30] Foreign Application Priority Data

Mar. 5, 1987 [JP] Japan ................................. 62-51282

[51] Int. Cl.⁵ .............................................. H04Q 7/04
[52] U.S. Cl. .................................... 379/62; 379/58; 379/184; 379/185
[58] Field of Search ................. 379/61, 62, 63, 58, 379/168, 184, 161, 185

[56] References Cited

U.S. PATENT DOCUMENTS

| | | | |
|---|---|---|---|
| 3,435,151 | 3/1969 | Russel | 379/194 |
| 4,000,375 | 12/1976 | Kawamura | 379/184 |
| 4,075,434 | 2/1978 | Merritt, Jr. | 379/161 |
| 4,640,987 | 2/1987 | Tsukada et al. | 379/62 |
| 4,650,931 | 3/1987 | Tsukada et al. | 379/61 |
| 4,691,338 | 9/1987 | Makino | 379/61 |
| 4,718,080 | 1/1988 | Serrano et al. | 379/59 |
| 4,745,632 | 5/1988 | Duffy | 379/58 |
| 4,747,128 | 5/1988 | Chan et al. | 379/194 |
| 4,748,685 | 5/1988 | Rozanski, Jr. | 455/218 |

Primary Examiner—James Dwyer
Attorney, Agent, or Firm—Laff, Whitesel, Conte & Saret

[57] ABSTRACT

A branched telephone system having a plurality of telephones which are connected to a single subscriber line or to single radio apparatus functions to establish a priority set condition in which the communicating function of particular one of the telephones is validated to prevent the other telephones from being used, and further includes the function of automatically cancelling such a priority set condition.

4 Claims, 3 Drawing Sheets

BRANCHED TELEPHONE SYSTEM

BACKGROUND OF THE INVENTION

The present invention relates to a branched telephone system in which a plurality of telephones are connected to a single subscriber line or to single radio equipment and, more particularly, to a branched telephone system capable of automatically cancelling a priority set condition in which particular one of the plurality of telephones is usable.

In most of prior art branched telephone systems, two or more telephones are simply connected in parallel with no special control provided over them. In such a configuration, all the telephones share entirely the same functions and, therefore, it is impossible to give priority to the particular one of the plurality of telephones over the others or to positively invalidate the latter. For example, in a vehicle-mounted telephone system, two independent telephones may be connected to single radio equipment which is mounted on a vehicle and individually disposed in the vicinity of a front seat and a rear seat of the vehicle. It often occurs with such a vehicle-mounted telephone system that an occupant in the vehicle desires to invalidate one of the two telephones. In greater detail, the person, who wishes to originate a call on the particular one of the plurality of telephones near the rear sheet, may desire to keep the telephone number of the other party and the contents of communication from the driver.

SUMMARY OF THE INVENTION

It is, therefore, an object of the present invention to provide a branched telephone system capable of establishing a priority set condition in which the communication function of particular one of a plurality of telephones is validated to prevent the other telephones from being used.

It is another object of the present invention to provide a branched telephone system capable of automatically cancelling a priority set condition in which one of a plurality of telephones connected to a single line is validated with the others invalidated.

It is another object of the present invention to provide a generally improved branched telephone system.

A branched telephone system having a plurality of telephones which are connected to a single subscriber line or to single radio equipment of the present invention comprises priority setting means for establishing a priority set condition in which a particular one of the telephones is usable, with any other telephone being non functional and priority cancelling means for cancelling the priority set condition by detecting a change in a hook condition of any of the telephones to which priority is given over any other.

DESCRIPTION OF THE PREFERRED EMBODIMENT

Figure 1:
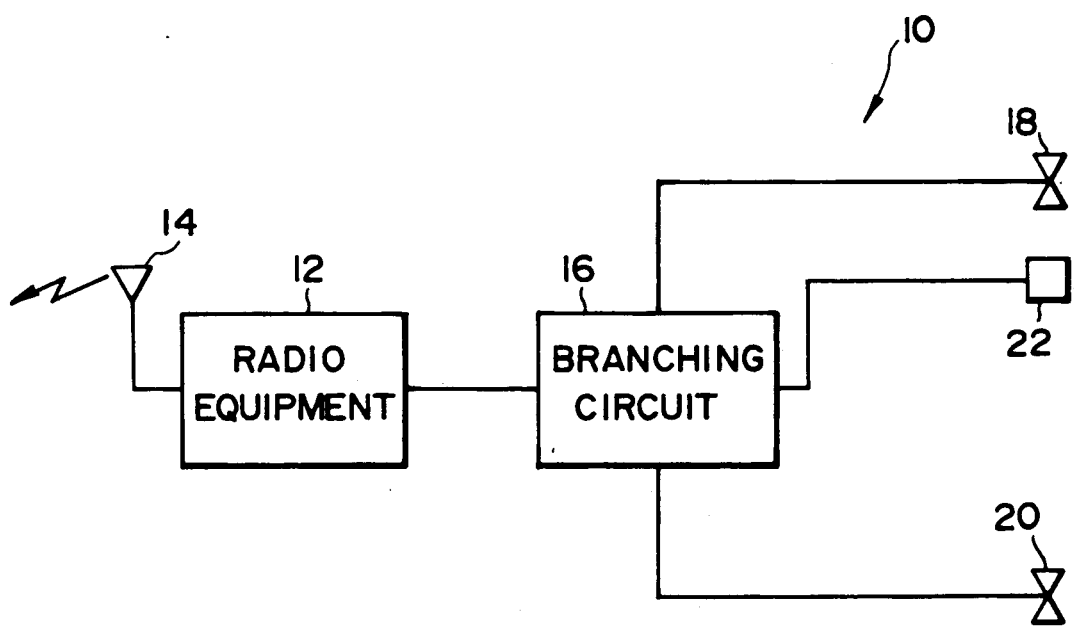
FIG. 1 is a schematic block diagram showing a branched telephone system in accordance with the present invention.

Referring to FIG. 1 of the drawings, a branched telephone system embodying the present invention is shown and generally designated by the reference numeral 10. As shown, the system 10 is made up of radio equipment 12 having an antenna 14, a branching circuit 16 provided with priority setting means, a master telephone 18, and a servant telephone 20. The telephones 18 and 20 are each connected to the radio equipment 12 via the branching circuit 16. A switch unit 22 located in the vicinity of the master telephone 18 is connected to the branching circuit 16 and accessible for setting a priority set condition.

Figure 2:
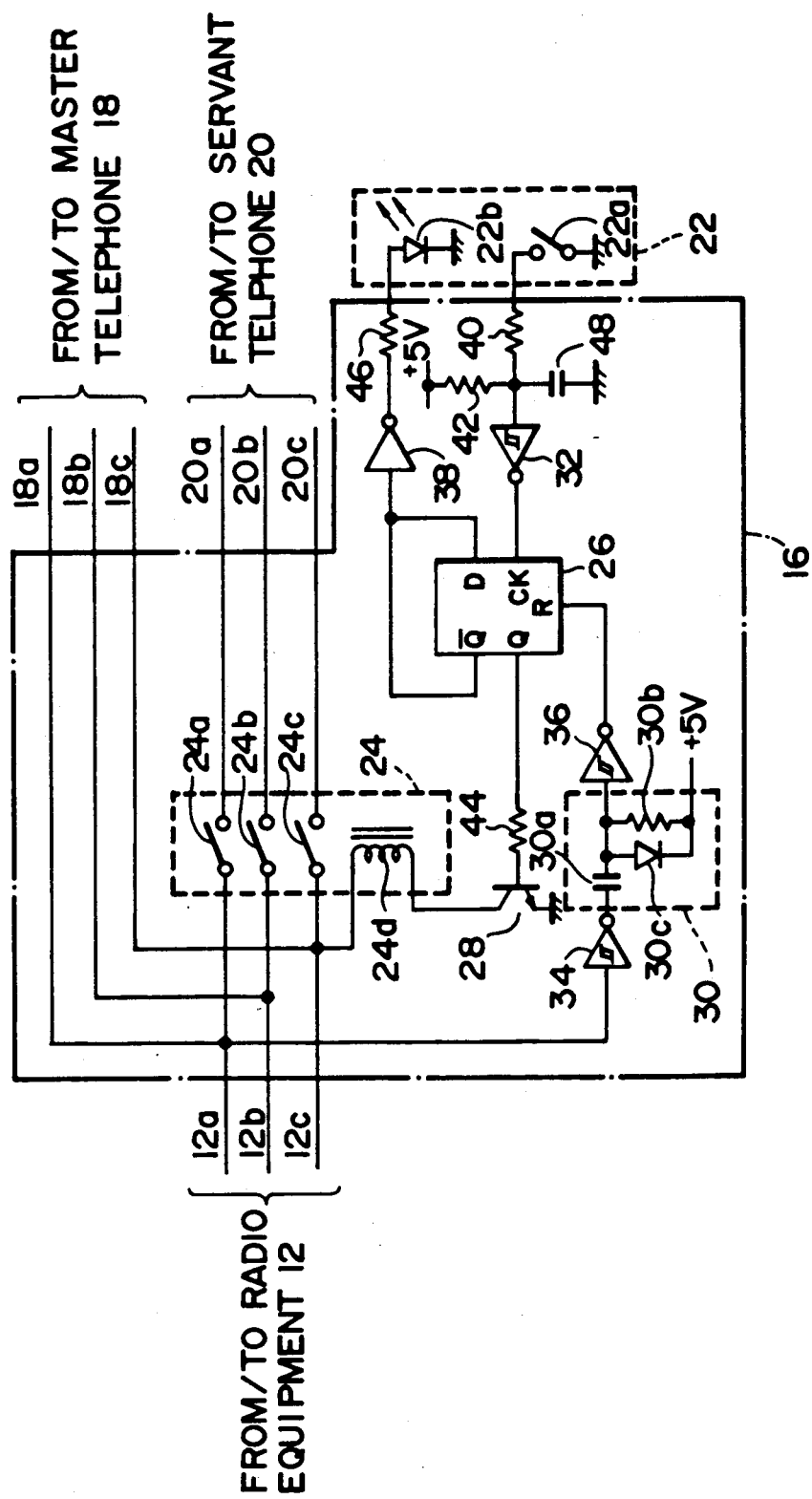
FIG. 2 is a circuit diagram showing a specific construction of a branching circuit and that of a switch unit as shown in FIG. 1.

FIG. 2 shows a specific construction of the branching circuit 16 and that of the switch unit 22. A speech signal and control signal line 12b and a power supply line 12c of the radio equipment 12 are directly connected to, respectively, a speech signal and control signal line 18b and a power supply line 18c of the master telephone 18. A hook signal line 18a of the master telephone 18 is held in direct connection with a hook signal line 12a of the radio equipment 12. On the other hand, a hook signal line 20a, a speech signal and control signal line 20b and a power supply line 20c of the servant telephone 20 are connected to, respectively, the hook signal line 12a, a speech signal and control signal line 12b and power supply line 12c of the radio equipment 12 via a relay 24.

Figure 3A:
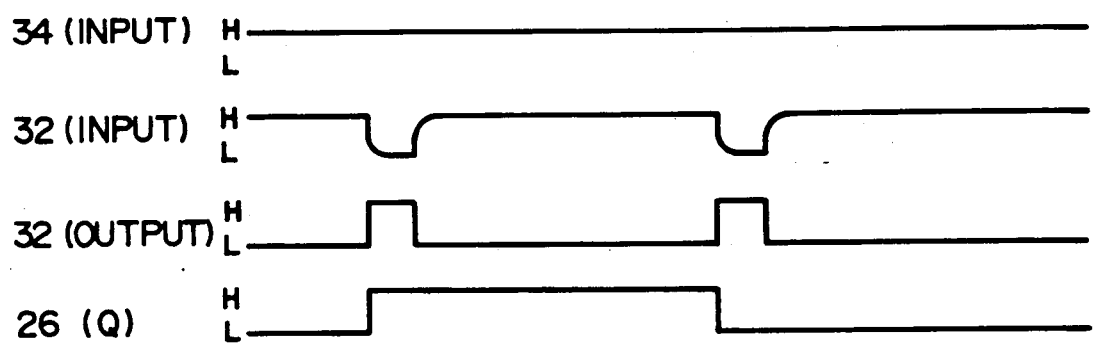
FIGS. 3A and 3B are waveform diagrams representative of signals which appear in various portions of FIG. 2.

A flip-flop 26 is connected between the switch unit 22 and the relay 24 while a transistor 28 is connected between the relay 24 and the flip-flop 26. Usually, the output Q of the flip-flop 26 is maintained low level so that the transistor 28 remains non-conductive. In this condition, no current flows through the winding 24d of the relay 24 to hold contacts 24a, 24b and 24c of the relay 24 closed, so that the servant telephone 20 is connected to the radio equipment 12 and usable in the same manner as the master telephone 18. When a contact 22a of the switch unit 22 is pressed, the output Q of the flip-flop 26 becomes high level, as shown in FIG. 3A. Then, the transistor 28 is turned on to cause a current to flow through the winding 24d of the relay 24, whereby the relay contacts 24a, 24b and 24c are opened. Consequently, the servant telephone 20 is electrically isolated from the radio equipment 12 and, therefore, unusable while the master telephone 18 alone is usable. In such a priority set condition, when the contact 22a of the switch unit 22 is pressed again, the output Q of the flip-flop 26 is inverte to low level restoring the servant telephone 20 to the usable condition.

Figure 3B:
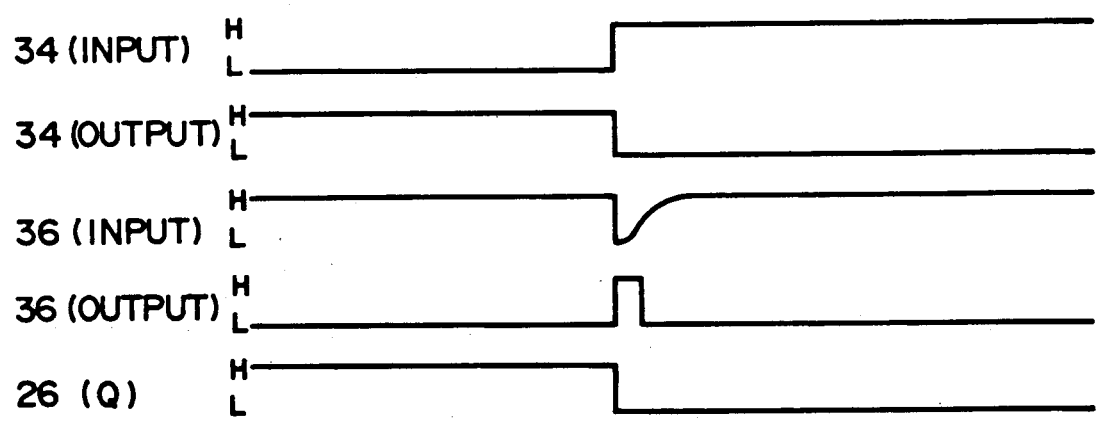

A light emitting diode 22b included in the switch unit 22 is adapted to display the state of the flip-flop 26 so that a person may see if the servant telephone 20 is usable through the switch unit 22. A differentiator 30 is made up of a capacitor 30a, a resistor 30b and a diode 30c. When a change of the hook signal from low level to high level (see FIG. 3B) is detected by the capacitor 30a and resistor 30b, a reset signal is fed from the differentiator 30 to the flip-flop 26 to thereby reset the output Q to low level. Now, assume that a person who is holding a communication on the master telephone 18 while giving priority to the telephone 18 through the switch unit 22 hangs up the receiver of the telephone 18 to end the communication. Then, the differentiator 30 detects the resulting change of the hook signal from low level to high level, resetting the flip-flop 26. As a result, the output Q of the flip-flop 26 becomes low level to close the contacts 24a, 24b and 24c of the relay 24 again, whereby the priority given to the main telephone 18 is cancelled. In FIG. 2, the reference numerals 32, 34 and 36 designate inverters, the reference numerals 40, 42, 44 and 46 designate resistors, and the reference numeral 48 designates a capacitor.

In summary, it will be seen that the present invention provides a branched telephone system with a capability of automatically cancelling a priority set condition. Specifically, the system of the invention automatically cancels a priority set condition by referencing the hook state of a telephone to which priority is given, preventing various undesirable occurrences ascribable to an inadvertent failure of cancellation.

Various changes and modifications will become possible for those skilled in the art after receiving the teachings of the present disclosure without departing from the scope thereof. For example, the present invention is applicable to telephone systems other than a vehicle-mounted telephone system shown and described, and telephone systems having more than two telephones. Further, the branching circuit and switch unit may be implemented with any known arrangement in place of the circuitry shown in FIG. 2.

What is claimed is:

1. A branched telephone system having a plurality of telephones which are connected to equipment, comprising:
   priority setting means responsive to a control signal for establishing a priority set condition in which a particular one of said plurality of telephones is usable and with the other of said plurality of telephones being invalidated in function, said plurality of telephones being usable during conditions other than when said particular one telephone is in said priority set condition;
   switch means for manually generating said control signal; and
   priority cancelling means for cancelling said priority set condition by detecting a change in an on-hook/off-hook condition of said particular telephone.

2. A branched telephone system as claimed in claim 1, wherein said function of said other telephones of said plurality of telephones comprises at least one of a communicating functions and a dial displaying function.

3. A branched telephone system as claimed in claim 1, further comprising indicator means for displaying said priority set condition.

4. A branched telephone system as claimed in claim 3, wherein said equipment comprises a single radio equipment and said system is mounted on a vehicle and wherein said particular one of said plurality of telephones is disposed in the vicinity of a rear seat and said other telephone is disposed in the vicinity of a front seat.

* * * * *